United States Patent
Lee et al.

(10) Patent No.: US 10,911,736 B2
(45) Date of Patent: Feb. 2, 2021

(54) MMT APPARATUS AND MMT METHOD FOR PROCESSING STEREOSCOPIC VIDEO DATA

(71) Applicant: Electronics and Telecommunications Research Institute, Daejeon (KR)

(72) Inventors: Jin Young Lee, Seoul (KR); Kug Jin Yun, Daejeon (KR); Won Sik Cheong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/565,148

(22) Filed: Sep. 9, 2019

(65) Prior Publication Data

US 2020/0007846 A1 Jan. 2, 2020

Related U.S. Application Data

(63) Continuation of application No. 15/574,026, filed as application No. PCT/KR2016/006333 on Jun. 15, 2016, now Pat. No. 10,412,364.

(30) Foreign Application Priority Data

Jun. 17, 2015 (KR) .................. 10-2015-0086168
Jun. 22, 2015 (KR) .................. 10-2015-0088689

(Continued)

(51) Int. Cl.
*H04N 13/00* (2018.01)
*H04N 13/194* (2018.01)
*H04N 13/161* (2018.01)
*H04N 21/2362* (2011.01)
(Continued)

(52) U.S. Cl.
CPC ......... *H04N 13/194* (2018.05); *H04N 13/139* (2018.05); *H04N 13/161* (2018.05);
(Continued)

(58) Field of Classification Search
CPC ............ H04L 65/602; H04N 21/26258; H04N 21/2381; H04N 21/23605; H04N 21/2665
(Continued)

(56) References Cited

U.S. PATENT DOCUMENTS

2013/0250059 A1  9/2013  Lee et al.
2013/0297817 A1  11/2013  Bae et al.
(Continued)

FOREIGN PATENT DOCUMENTS

CN  103329544 A  9/2013
CN  103535045 A  1/2014
(Continued)

OTHER PUBLICATIONS

International Standard (ISO/IEC 23008-1), "Information technology—High efficiency coding and media delivery in heterogeneous environments", Jun. 1, 2014, pp. 1-91, International Organization for Standardization (ISO) and International Electrotechnical Commission (IEC), Geneva, Switzerland.
(Continued)

*Primary Examiner* — Robert Chevalier
(74) *Attorney, Agent, or Firm* — William Park & Associates Ltd.

(57) ABSTRACT

An MPEG media transport (MMT) apparatus and method for processing stereoscopic video data are provided. The MMT apparatus includes an asset file generator configured to generate a single asset file that contains an entire or part of the stereoscopic video data; and a signaling message generator configured to generate a signaling message for delivery or consumption of the stereoscopic video data. At least one of the generated single asset file and the generated signaling message contains stereoscopic video information related to the stereoscopic video data.

18 Claims, 15 Drawing Sheets

(30) Foreign Application Priority Data

Nov. 2, 2015 (KR) ........................ 10-2015-0153397
Jun. 10, 2016 (KR) ........................ 10-2016-0072720

(51) Int. Cl.
*H04N 21/234* (2011.01)
*H04N 21/235* (2011.01)
*H04N 13/139* (2018.01)
*H04N 21/81* (2011.01)
*H04N 21/84* (2011.01)
*H04N 21/854* (2011.01)

(52) U.S. Cl.
CPC ......... *H04N 21/234* (2013.01); *H04N 21/235* (2013.01); *H04N 21/2362* (2013.01); *H04N 21/816* (2013.01); *H04N 21/84* (2013.01); *H04N 21/85406* (2013.01)

(58) Field of Classification Search
USPC ........ 348/43, 42, 46, 51; 386/326, 328, 329, 386/330, 331, 332
See application file for complete search history.

(56) References Cited

U.S. PATENT DOCUMENTS

| | | |
|---|---|---|
| 2014/0078249 A1 | 3/2014 | Wang |
| 2014/0351874 A1 | 11/2014 | Yoo et al. |
| 2015/0179218 A1 | 6/2015 | Nadler |
| 2015/0201207 A1 | 7/2015 | Yie et al. |
| 2015/0296231 A1 | 10/2015 | Kwon et al. |
| 2019/0141354 A1* | 5/2019 | Hwang ................. H04N 19/89 |

FOREIGN PATENT DOCUMENTS

| | | |
|---|---|---|
| CN | 103843351 A | 6/2014 |
| EP | 2629529 A2 | 8/2013 |
| JP | 2011244411 A | 12/2011 |
| JP | 2014534696 A | 12/2014 |
| KR | 1020090026012 A | 3/2009 |
| KR | 1020120065943 A | 6/2012 |
| KR | 1020120138687 A | 12/2012 |
| KR | 1020130031767 A | 3/2013 |
| KR | 1020140090202 A | 7/2014 |
| WO | 2013048148 A2 | 4/2013 |

OTHER PUBLICATIONS

Jangwon Lee et al., The File Format Standard Specification for 3D Video Service: Stereoscopic Video Application Format. The 6th Journal of Telecommunications Technology Association for Information Communication Standardization, Dec. 2010, pp. 46-58.

* cited by examiner

FIG. 5

```
aligned(8) class StereoscopicVideoInformationBox
      extends FullBox('svin', version, 0){ unsigned int(8) stereoscopic_composition_type;
         unsigned int(7) reserved;
      unsigned int(1) is_left_first;

if (stereoscopic_composition_type == 0x03)
            unsigned int(1) is_left;
            unsigned int(7) reserved;

AssetIdentifierBox(); // Provides matching view Asset information
         }
} aligned(8) class AssetIdentifierBox {
      unsigned int(32) asset_id_scheme;
      unsigned int(32) asset_id_length;
      unsigned int(8) asset_id_value[asset_id_length];
}
```

FIG. 7

```
aligned(8) class StereoscopicVideoInformationBox
      extends FullBox('svin', version, 0){ unsigned int(1) is_service_compatible;
      unsigned int(7) reserved;

if (is_service_compatible){
            unsigned int(1) is_left;
            unsigned int(1) is_base;
            unsigned int(6) reserved;

AssetIdentifierBox(); // Provides matching view Asset information
      }
      else{
        unsigned int(8) stereoscopic_composition_type;
        unsigned int(7) reserved;
      unsigned int(1) is_left_first;
      }
} aligned(8) class AssetIdentifierBox {
      unsigned int(32) asset_id_scheme;
      unsigned int(32) asset_id_length;
      unsigned int(8) asset_id_value[asset_id_length];
```

FIG. 8

```
stereoscopic_video_info_descriptor{
        unsigned int(8) stereoscopic_composition_type;
        unsigned int(7) reserved;
    unsigned int(1) is_left_first;

if (stereoscopic_composition_type == 0x03)
            unsigned int(1) is_left;
            unsigned int(7) reserved;

asset_id() // Provides matching view Asset information
        }
}
```

FIG. 9

```
stereoscopic_video_info_descriptor{
      unsigned int(1) is_service_compatible;
      unsigned int(7) reserved;

if (is_service_compatible){
            unsigned int(1) is_left;
            unsigned int(1) is_base;
            unsigned int(6) reserved;

asset_id() // Provides matching view Asset information
        }
        else{
        unsigned int(8) stereoscopic_composition_type;
        unsigned int(7) reserved;
      unsigned int(1) is_left_first;
        }
}
```

FIG. 12

| SYNTAX | NUMBER OF BITS |
|---|---|
| HEVC_stereoscopic_video_info_descriptor { | |
|     Descriptor_tag | 8 |
|     Descriptor_length | 8 |
|     Service_id | 16 |
|     View_position | 1 |
|     Multiview_view_position_SEI_present | 1 |
|     Reserved | 6 |
| } | |

FIG. 13

| SYNTAX | NUMBER OF BITS |
|---|---|
| multiview_view_position(){<br>   num_views_minus1<br>   for(i=0;i<=num_views_minus1; i++)<br>      view_position[i]<br>   } | ue(v)<br><br>ue(v) |

MMT APPARATUS AND MMT METHOD FOR PROCESSING STEREOSCOPIC VIDEO DATA

CROSS-REFERENCE TO RELATED APPLICATION

The present application is a continuation application of U.S. patent application Ser. No. 15/574,026 filed on Apr. 12, 2018, which is a U.S. national stage patent application of PCT/KR2016/006333 filed on Jun. 15, 2016, which claims priority to Korean patent applications: KR10-2015-0086168 filed on Jun. 17, 2015, KR10-2015-0088689 filed on Jun. 22, 2015, KR10-2015-0153397 filed on Nov. 2, 2015, and KR10-2016-0072720 filed on Jun. 10, 2016 with the Korean Intellectual Property Office, which is incorporated herein by reference in its entirety.

TECHNICAL FIELD

The present invention relates to a MPEG media transport (MMT) technology, and more specifically, to an MMT apparatus and method for processing stereoscopic video data.

BACKGROUND ART

MPEG media transport (hereinafter, referred to as "MMT") is a new standard technology developed by an MPEG systems sub-working group to store and transfer multimedia content. Existing standard technologies developed by the MPEG systems sub-working group define functions required for multimedia content transmission over a broadcasting network, such as packetization, synchronization, multiplexing, and so on, and have been standardized and widely used as an MPEG-2 transport stream (TS) technology. As developed based on existing broadcasting networks, the MPEG-2 TS technology has elements that are not suitable for multimedia content transmission for IPTV broadcasting or mobile broadcasting through an Internet protocol (IP)-based network, which makes said technology inefficient. Thus, the MPEG systems sub-working group has come to realize a need for a new media transport standard in consideration of the new media transmission environment and an anticipated future media transmission environment, and as the result, has developed the MMT standard.

"ISO/IEC 23008-1", as a currently created MMT standard, is a standard for storage and transfer of media data, defining that an asset, which is media data, undergoes encapsulation using an MMT system and is stored or transferred as an individual file. However, the recently agreed MMT standard supports functions for processing and consumption of multimedia content that includes 2D images, but not multimedia content that includes stereoscopic video.

With the increasing popularity of high definition video streaming services over the Internet, ultra-high definition television (UHDTV) services have been highlighted and at the same time, digital broadcasting services using stereoscopic videos, i.e., 3D videos have attracted attention as next-generation broadcasting services. In particular, it is anticipated that a 3DTV service will be available in near future which allows users to enjoy 3D videos at home based on the development of relevant technologies, such as 4K or higher resolution general-use stereoscopic display.

According to this trend, standardization (e.g., ATSC 3.0) is in progress by, for example, Advanced Television Systems Committee (ATSC) for the purpose of 4K UHD broadcasting services. Under such a circumstance, in order to provide a 3DTV service, a method is necessarily adopted in which 3D content is transferred while maintaining compatibility with a 4K UHD broadcasting service for 2D content, and a problem of this method is that larger bandwidth is needed to transmit the 3D content, as compared to that for 2D content. To address this problem, ATSC is developing the technology by adding an additional channel to an existing channel to provide a 3DTV broadcasting service. In other words, ATSC 3.0 is standardizing a 3DTV broadcasting service using two UHD channels or HD channels, that is, multi-channels, and has adopted High Efficiency Video Coding (HEVC) or scalable HEVC (SHVC) as a coding method for providing the service.

ATSC 3.0, however, has not yet specifically proposed an approach to transmit stereoscopic video data for a 3DTV broadcasting service. In order to provide a 3DTV broadcasting service, providing of 3D content through an MPEG system may be considered, but, as described above, the MPEG-2 TS technology is not suitable for current broadcasting networks, whereas the MMT technology has not yet supported transmission of 3D content.

DETAILED DESCRIPTION OF THE INVENTION

Technical Problem

To solve the aforementioned drawbacks, one objective of the present invention is to provide an MPEG media transport (hereinafter, referred to as "MMT") apparatus and method for processing stereoscopic video data such that stereoscopic video content is stored and/or transmitted in an MMT system.

Another objective of the present invention is to provide an MMT apparatus and method for processing stereoscopic video data such that a high-definition 3DTV broadcasting service is provided while maintaining compatibility with a 2DTV broadcasting service.

Technical Solution

To solve the aforesaid drawbacks, according to one exemplary embodiment of the present invention, there is provided an MPEG media transport (hereinafter, referred to as "MMT") apparatus for processing stereoscopic video data, including: an asset file generator configured to generate a single asset file that contains an entire or part of the stereoscopic video data; and a signaling message generator configured to generate a signaling message for delivery or consumption of the stereoscopic video data, wherein at least one of the single asset file and the signaling message contains stereoscopic video information related to the stereoscopic video data.

According to one aspect of the exemplary embodiment, the stereoscopic video information may include: composition type information that specifies a way in which a left-view image and a right-view image are combined to form a stereoscopic video; video sequence description information that specifies an order of the left-view image and the right-view image which are combined in the stereoscopic video; and video type description information that indicates whether a video of a specific view that constitutes the stereoscopic video is a left-view image or a right-view image. In this case, the composition type information may indicate one of the following types: a side-by-side type, a vertical line interleaved type, a frame sequence type, a left/right view sequence type, and a top-bottom type. In addition, the video type description information may be included only when the composition type information indicates a left/right view sequence type. The stereoscopic video information may be created in a syntax format of stereoscopic video media information (svmi) box specified by ISO/IEC 23008-11, and be contained in the single asset file, or the stereoscopic video information may be created in a syntax format of a stereoscopic video information descriptor specified by ISO/IEC 23008-1 and be contained in an MMT package (hereinafter, referred to as "MP") table of the signaling message.

According to another aspect of the exemplary embodiment, the stereoscopic video information may include: service compatibility information that indicates whether or not a stereoscopic video is compatible with a 2D video service; video type description information that indicates whether a video of a specific view that constitutes the stereoscopic video is a left-view image or a right-view image; base video description information that indicates whether a video of a specific view that constitutes the stereoscopic video is usable for a 2D video service; composition type information that specifies a way in which a left-view image and a right-view image are combined to form the stereoscopic video; and video sequence description information that specifies an order of the left-view image and the right-view image which are combined in the stereoscopic video, wherein the video type description information and the base video description information are included only when the service compatibility information indicates that the stereoscopic video is compatible with a 2D video service, and the composition type information and the base video description information are included only when the service compatibility information indicates that the stereoscopic video is not compatible with a 2D video service. The stereoscopic video information may be created in a syntax format of stereoscopic video information (svin) box specified by ISO/IEC 23008-1, and be contained in the single asset file, or the stereoscopic video information may be created in a syntax format of stereoscopic video information descriptor specified by ISO/IEC 23008-1, and be contained in an MP table in the single asset file.

To solve the aforesaid drawbacks, according to another exemplary embodiment of the present invention, there is provided a method of processing stereoscopic video data in an MMT apparatus, the method including: generating a single asset file that contains an entire or part of the stereoscopic video data; and generating a signaling message for delivery or consumption of the stereoscopic video data, wherein at least one of the single asset file and the signaling message is generated by including stereoscopic video information related to the stereoscopic video data in the single asset file or the signaling message.

According to one aspect of the exemplary embodiment, the stereoscopic video information may include: composition type information that specifies a way in which a left-view image and a right-view image are combined to form a stereoscopic video; video sequence description information that specifies an order of the left-view image and the right-view image which are combined in the stereoscopic video; and video type description information that indicates whether a video of a specific view that constitutes the stereoscopic video is a left-view image or a right-view image, the composition type information may indicate one of the following types: a side-by-side type, a vertical line interleaved type, a frame sequence type, a left/right view sequence type, and a top-bottom type, and the video type description information may be included only when the composition type information indicates a left/right view sequence type. In addition, the stereoscopic video information may be created in a syntax format of stereoscopic video media information (svmi) box specified by ISO/IEC 23008-11 and be contained in the single asset file, or the stereoscopic video information may be created in a syntax format of a stereoscopic video information descriptor specified by ISO/IEC 23008-1 and be contained in an MP table of the signaling message.

Advantageous Effects

According to the aforesaid embodiments of the present invention, stereoscopic video information is contained in an asset file and/or a signaling message, so that it is possible to store and/or transmit stereoscopic video content in an MMT system. Furthermore, as stereoscopic information includes composition type information, video sequence description information, video type description information, and so on, a high-definition 3DTV broadcasting service can be provided while maintaining compatibility with a DTV broadcasting service.

DESCRIPTION OF DRAWINGS

FIG. 5 is a diagram illustrating an example of file syntax for representing an asset file header of FIG. 4.

FIG. 7 is a diagram illustrating an example of file syntax that represents an asset file header of FIG. 6.

FIG. 8 is a diagram illustrating an example of a stereoscopic video information descriptor (hereinafter, referred to as "stereoscopic_video_info_descriptor") that can be contained in an MMT package (hereinafter, referred to as "MP") table.

FIG. 9 is a diagram illustrating another example of stereoscopic_video_info_descriptor that can be contained in an MP table.

FIG. 12 is a diagram illustrating another example of the stereoscopic video information transmitted at the system level, which is HEVC_stereoscopic_video_info_descriptor.

FIG. 13 is a diagram illustrating an example of a 2D/3D indicator (hereinafter, referred to as "multi_view_position_SEI") message.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Terms used throughout this specification are defined in consideration of functions according to exemplary embodiments, and can be varied according to a purpose of a user or manager, or precedent and so on. Unless otherwise defined, all terms used herein have the same meaning as commonly understood by one of ordinary skill in the art to which this invention belongs.

Figure 1:
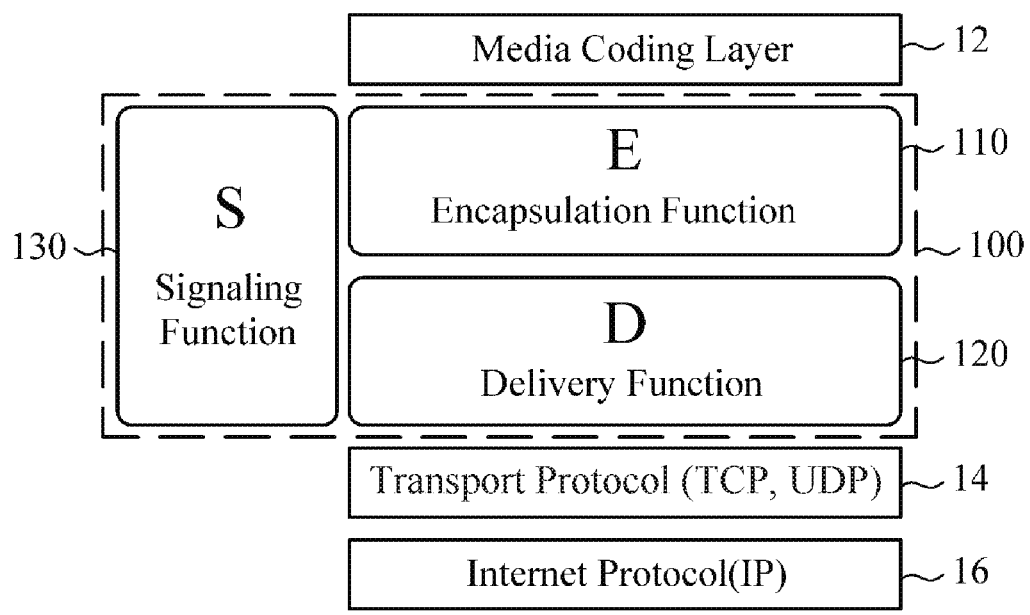
FIG. 1 is a diagram illustrating a hierarchical structure which includes functional areas of an MPEG media transport (hereinafter, referred to as "MMT") system.

FIG. 1 is a diagram illustrating a hierarchical structure which includes functional areas of an MPEG media transport (MMT) system. Referring to FIG. 1, the MMT system 100 consists of encapsulation function layer (Layer E) 110, a delivery function layer (Layer D) 120, and a signaling function layer (Layer S) 130.

Multimedia data compressed in a media coding layer 12 passes through the encapsulation function layer 110, in which the data is processed into a package of a form similar to a file format, and then the resulting package is output. The encapsulation function layer 110 receives coded media data provided from the media coding layer, generates data fragment or segment that is a small unit for MMT service, and generates access units (AUs) for MMT service by using the data fragment. In addition, the encapsulation function layer 110 aggregates and/or segments the AUs to generate composite content and data of a predetermined format for storing and/or transmitting said composite content.

The delivery function layer 120 may perform network flow multiplexing of media transmitted over a network, network packetization, QoS control, and the like. To be specific, the delivery function layer 120 may convert one or more data units (DUs) output from the encapsulation function layer 110 into an MMT payload format, and then add an MMT transport packet header to create an MMT packet, or may create an RTP packet using a real-time protocol (RTP) that is a conventional transport protocol. Packets formed in the delivery function layer 120 pass through a transport protocol layer 14, such as a user datagram protocol (UDP) layer or a transport control protocol (TCP) layer, before entering an Internet protocol (IP) layer 16 in which the packets are ultimately IP packetized and then transmitted.

The signaling function layer 130 generate a message of a predetermine format that contains control information or signaling information that is required for package delivery and consumption. The generated signaling message may be packetized together with media data into an MMT packet for delivery, or may be packetized into a MMT packet as a separate signaling message and transmitted to a receiving side.

Figure 2:
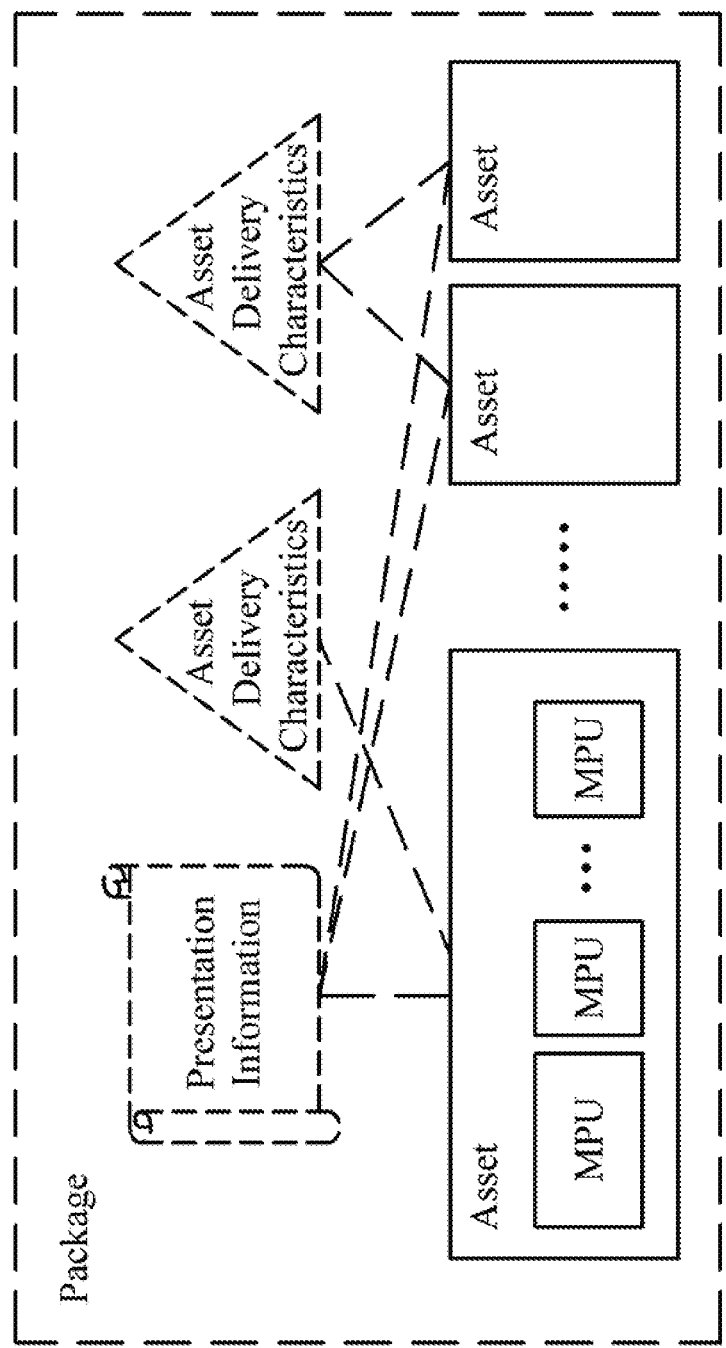
FIG. 2 is a diagram illustrating a logical structure of an MMT package.

FIG. 2 is a diagram illustrating a logical structure of an MMT package, showing elements that constitute the MMT package and the relationship between said elements.

Referring to FIG. 2, the MMT package is a group of media content data and related metadata, and is composed of presentation information (PI), one or more assets, and transport characteristics (TCs). The PI is information that describes the spatial and temporal relationships among MMT assets. The asset is encoded media data, such as audio, video, and webpage, and each asset has an asset ID as an identifier. Each asset may include one or more media processing units (MPUs), each of which is a file in accordance with the International Standard Organization-Base Media File Format (ISO-BMFF) and can be independently consumed. Two successive MPUs in one asset cannot contain the same media sample. In addition, the TC provides QoS information required for asset delivery. One asset only can have one TC, while one TC can be used by multiple assets.

According to the MMT technology, in a stereoscopic video composed of separate frames of a left-view image and a right-view image, the left-view image and the right-view image have different asset IDs. In the MMT technology, transmission and playback of content and associated data processing or service quality control are considered as separate files and independently processed. Hence, in order to reconstruct and play back the left-view and right-view images, the left-view asset and the right-view asset need to be time-synchronized with each other so that 3-dimensional (3D) video can be played. Also, in the case of stereoscopic video composed of a left-view asset and a right-view asset, it may be preferable to design the stereoscopic video to be compatible with a 2-dimensional (2D) display.

Further, in the stereoscopic video, the left-view image and the right-view image may be formed of different frames, respectively, or the stereoscopic video may be formed by combining the left-view image and the right-view image into one frame using various methods. For example, in the stereoscopic video, the left-view image and the right-view image may be combined into one frame in a side-by-side type, a top-bottom type, or a vertical line interleaved type. In this case, the stereoscopic video, as a whole, formed by combining the left-view and right-view images, may be considered as one asset, but is not limited thereto, such that the left-view image and the right-view image may be considered as separate assets.

As such, the stereoscopic video may be formed using various types of composition. In addition, the stereoscopic video combined into one frame may be itself composed of one asset, or the left-view image and the right-view image of said one frame may be composed of different assets, respectively. Furthermore, the stereoscopic video data is preferably played back using not only a 3D display, but also a 2D display. In order to allow the stereoscopic video data to be stored through an MMT system or to be transmitted from an MMT sending entity to an MMT receiving entity, it is required to process stereoscopic video data by sufficiently taking into consideration the characteristics of the aforesaid stereoscopic video.

Figure 3:
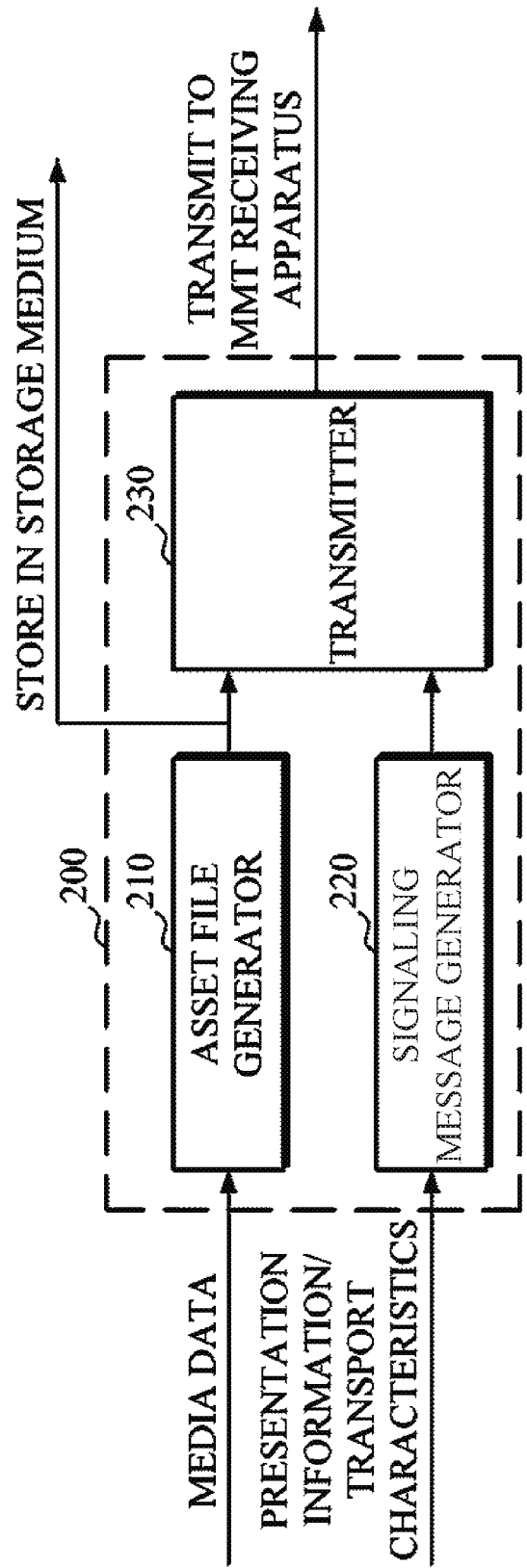
FIG. 3 is a block diagram illustrating a configuration of an MMT apparatus for processing stereoscopic video data according to an exemplary embodiment of the present invention.

FIG. 3 is a block diagram illustrating a configuration of an MMT apparatus for processing stereoscopic video data according to an exemplary embodiment of the present invention. Referring to FIG. 3, an MMT apparatus 200 includes an asset file generator 210 and a signaling message generator 220. Also, the MMT apparatus 200 may further include a transmitter 230. All or part of components (or functions) of the MMT apparatus shown in FIG. 3 may be implemented as components (or functions) of an MMT sending entity specified by the MMT standard.

The asset file generator 210 generates an asset file for each asset based on an access unit (AU). Here, the "asset file"

does not necessarily refer to a single physical file, but may refer to a group of numerous files. In other words, the "asset file" is a group of one or more files, each containing not only encoded stereoscopic video data that forms a single asset, but also relevant stereoscopic video information. As described above, in the case of stereoscopic video, each of a left-view image and a right-view image may form one asset file, or a stereoscopic video image combined into one frame of a designated type may itself form one asset file. In the former case, part of stereoscopic video data is contained in a single asset file, while in the latter case the entire stereoscopic video data is contained in a single asset file.

The asset file generated by the asset file generator 210 of FIG. 3 may be stored in a storage medium, in which the generated asset file must contain stereoscopic video information. Alternatively, if the asset file generated by the asset file generator 210 is input to the transmitter 230 and transmitted to an MMT receiving apparatus, the generated asset file of this case may or may not contain stereoscopic video information. This is because a signaling message created by the signaling message generator 220 may carry the stereoscopic video information, as described below. Now a case will be discussed in which the stereoscopic video information is contained in the asset file generated by the asset file generator 210.

Figure 4:
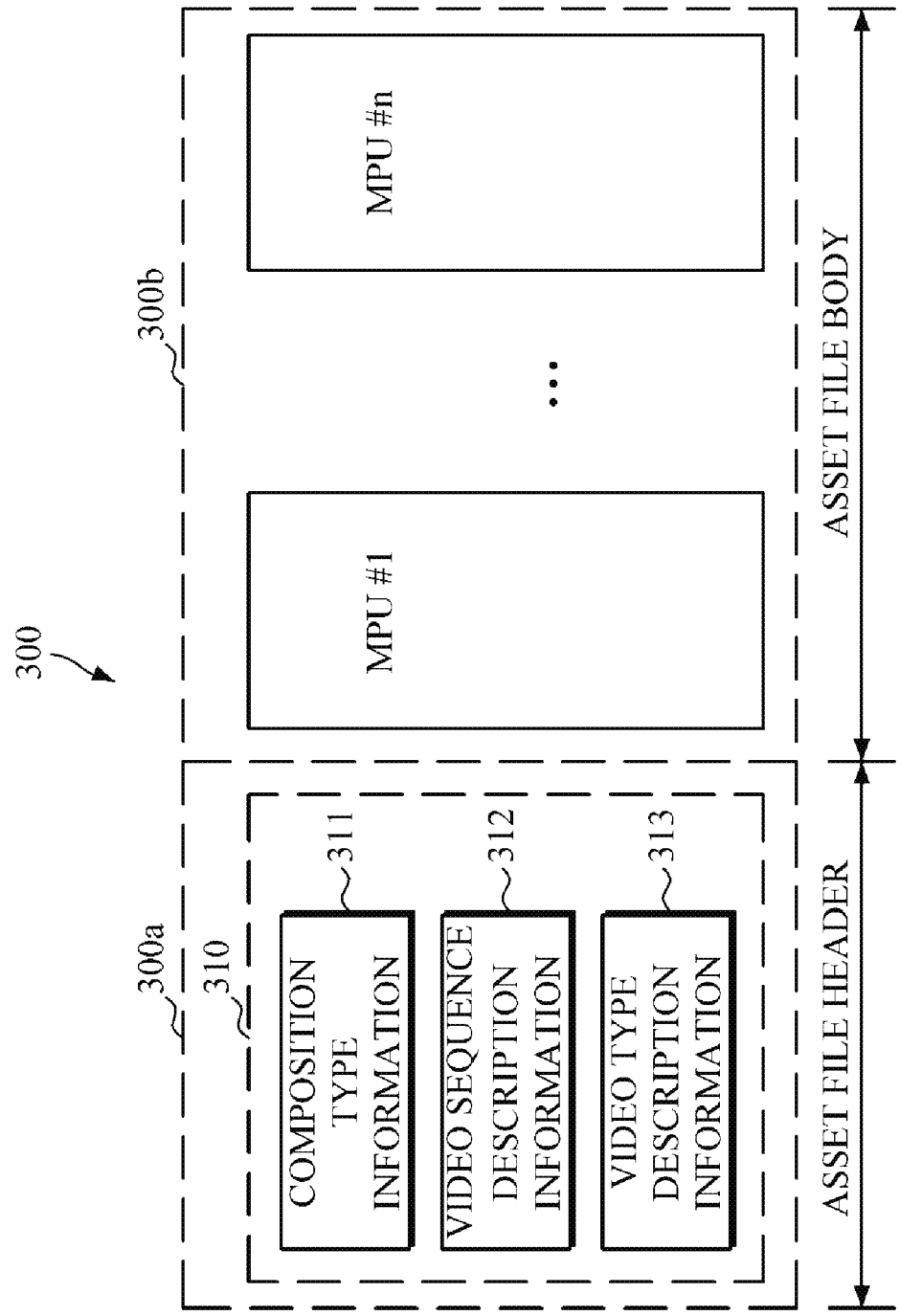
FIG. 4 is diagram illustrating an example of a general configuration of an asset file generated by an asset file generator of FIG. 3.

FIG. 4 is diagram illustrating an example of a general configuration of an asset file generated by the asset file generator 210 of FIG. 3. Referring to FIG. 4, the asset file 300 includes an asset file header 300a and an asset file body 300b. The configuration of the asset file 300 is logical based on characteristics of data contained in each unit, and may be implemented in various physical forms. For example, the asset file header 300a and the asset file body 300b are not necessarily constructed as a single file, and may be each composed of one file or each composed of multiple files.

The asset file body 300b is a unit that contains at least stereoscopic video data, and may be formed of, for example, a plurality of MPUs. The asset file body 300b is a part where stereoscopic data is contained, and may correspond to a payload of the asset file. As described above, the MPU may be a file of a specific format that is encapsulated according to the ISO-BMFF, and said MPU has a unique sequence number as well as an asset ID. The MPUs that constitute the same asset have the same asset IDs. The MPUs contain encoded stereoscopic video data and each MPU contains one media track at most.

The asset file header 300a contains a variety of information related to the asset, i.e., asset file information. In particular, if the asset is a left-view asset or a right-view asset that constitutes stereoscopic video data, the asset file header 300a may contain stereoscopic video information 310 as one of asset file information. Besides, the asset file header 300a may further contain information about the asset ID, such as a scheme, a length, a value, and the like of the asset ID (refer to FIGS. 5 and 7).

According to one aspect of the present embodiment, the stereoscopic video information 310 may include composition type information 311, video sequence description information 312, and video type description information 313. The composition type information 311 specifies a way in which a left-view image and a right-view image are combined to form the stereoscopic video. For example, the composition type information 311 may indicate one of the following types: a side-by-side type, a vertical line interleaved type, a frame sequential type, a left/right view sequence type, and a top-bottom type.

Table 1 shows an example of composition type information 311. Referring to Table 1, it is seen that, as the composition type information, 311, the side-by-side type and the top-bottom type are available for two types of images: full image and half image. In addition, it may be apparent to those skilled in the art that values in the left column of Table 1 are only exemplary.

TABLE 1

| Value | Description |
|---|---|
| 0x00 | Side-by-side (half) type |
| 0x01 | Top-Bottom (half) type |
| 0x02 | Side-by-side (Full) type |
| 0x03 | Top-Bottom (Full) type |
| 0x04 | 0x04 Vertical line interleaved type |
| 0x05 | Frame sequential type |
| 0x06-0xFF | Reserved |

The video sequence description information 312 specifies the order of the left-view image and the right-view image which are combined in the stereoscopic video. For example, the video sequence description information 312 may be represented as "is_left_first" or "is_right_first". Table 2 shows examples of the video sequence description information 312. Referring to Table 2, according to the video sequence description information (in the case of Table 2, a value of "is_left_first"), a position of each of a left-view and a right-view in a frame or if each of the left-view and the right-view is an odd-numbered frame or an even-numbered frame in a sequence of frames can be identified for each composition type.

TABLE 2

| Value | Description |
|---|---|
| 0x00 | Side-by-side (half) type |
| 0x01 | Vertical line interleaved type |
| 0x02 | Frame sequential type |
| 0x03 | Left/Right view sequence type |
| 0x04 | Top-Bottom (half) type |
| 0x05 | Side-by-side (Full) type |
| 0x06 | Top-Bottom (Full) type |
| 0x07-0xFF | Reserved |

The video type description information 313 indicates whether a video of a specific view is a left-view image or a right-view image. For example, the video type description information 313 may be represented in such a manner to show whether a video of a specific view "is_left" or "is_right". Therefore, the video type description information 313 may be provided only when the composition type information 311 indicates that the composition type of the left-view image and the right-view image is a left/right view sequence type (in the case where a value is "0x03" in Table 1).

FIG. 5 is a diagram illustrating an example of file syntax for representing the asset file header 300a of FIG. 4. The file syntax of FIG. 5 is created based on stereoscopic video media information (svmi) box file format of ISO/IEC 23008-11, which is provided only for example. The asset file header 300a of FIG. 4 may be created based on other standards or other file formats.

Referring to FIG. 5, the composition type information 311 of FIG. 4 is represented by an element, "stereoscopic_composition_type", and, for example, said element may describe the content as shown in Table 1. In addition, the video sequence description information 312 is represented by an element, "is_left_first", and, for example, said element may describe the content as shown in Table 2. Also, the video type description information 313 is represented by an element, "is_left", and it may be understood that said element is included only when "stereoscopic_composition_type" has a value of "0x03", which indicates a left/right view sequence type. In addition, the file syntax may further include elements for indicating a scheme, a length, and a value of an asset ID.

Figure 6:
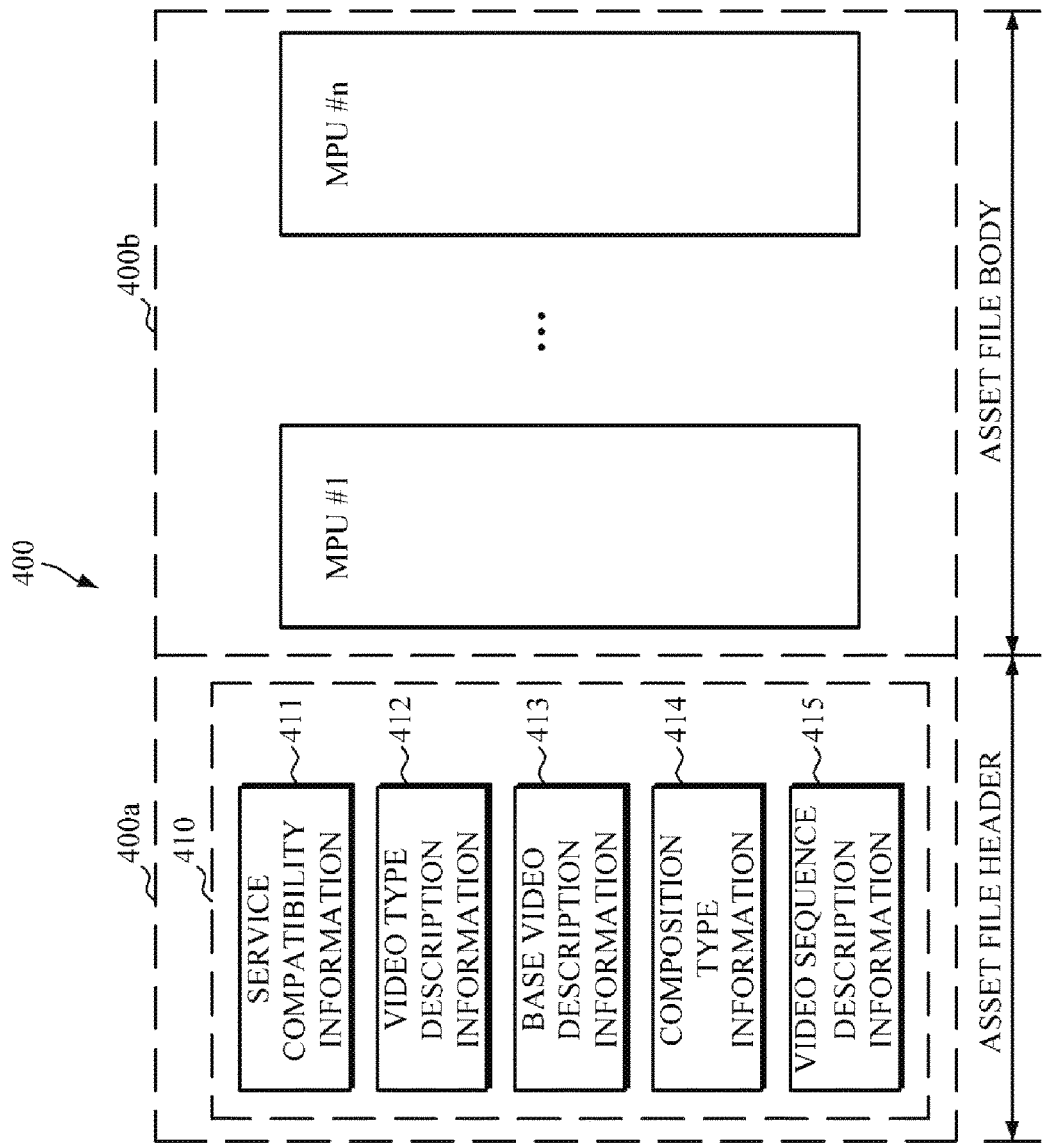
FIG. 6 is a diagram illustrating another example of a general configuration of the asset file generated by the asset file generator of FIG. 3.

FIG. 6 is a diagram illustrating another example of a general configuration of the asset file generated by the asset file generator 210 of FIG. 3. The configuration of the asset file 400 of FIG. 6 is also logical based on characteristics of data contained in each unit, and may be implemented in various physical forms. For example, an asset file header 400a and an asset file body 400b may be each composed of a single file or multiple files. Referring to FIG. 6, the asset file 400 has the same configuration of the asset file 300 of FIG. 4 in that it includes the asset file header 400a and the asset file body 400b. In addition, the asset file body 400b is the same as the asset file body 300b of FIG. 4 in that said asset file body 400b is a unit that contains at least stereoscopic video data and may consist of, for example, a plurality of MPUs, and therefore, the detailed description thereof will not be reiterated.

The asset file header 400a is the same as the asset file header 300a of FIG. 3 in that the asset file header 400a includes a variety of information about the relevant asset, i.e., asset file information, and in particular, in the case where the asset is a left-view asset or a right-view asset that constitutes the stereoscopic video data, the asset file header 400a may contain stereoscopic video information 410 as the asset file information. There is, however, a difference in detail between the asset file header 400a and the asset file header 300a. Specifically, the stereoscopic information 410 may include service compatibility information 411, video type description information 412, base video description information 413, composition type information 414, and video sequence description information 415.

The service compatibility information 411 is information to describe whether a stereoscopic video is compatible with a 2D video service ("is_service_compatible"). For example, if a stereoscopic video is usable for a 2D video service without having to be processed by a special image processing technology, the stereoscopic video may be regarded to be compatible with a 2D video service. Generally, in the case of a stereoscopic video of a left/right view sequence type, the provision of a 2D video service is possible by extracting a left-view image and a right view image. In the case of stereoscopic videos of the other composition types, additional image processing for each frame is required in order to provide a 2D video service.

The video type description information 412 and the base image description information 413 may be information that are included in the stereoscopic information 410 only when the stereoscopic video is compatible with a 2D video service, that is, when the service compatibility information 411 has a value indicating that the stereoscopic video is compatible. Here, the video type description information 412 describes whether a video of a specific view is a left-view image or a right-view image. For example, the video type description information 412 may be represented in such a manner to show whether a video of a specific view "is_left" or "is_right". In addition, the base video description information 413 indicates whether a video of a specific view is usable for a 2D video service, that is, whether said video is a base video ("is_base"). Therefore, only a video of a specific view that is specified as a base video by the base video description information 413 can be used for a 2D video service.

The composition type information 414 specifies a way in which a left-view image and a right-view image are combined to form a stereoscopic video. For example, the composition type information 414 may indicate one of the following types: a side-by-side type, a vertical line interleaved type, a frame sequential type, and a top-bottom type. The composition type information 414 is different from the composition type information 311 of Table 1 in that the composition type information 414 does not include a left/right view sequence type.

Table 3 shows an example of the composition type information 414. Referring to Table 3, it is seen that, as the composition type information, 414, the side-by-side type and the top-bottom type are available for two types of images: full image and half image. In addition, it may be apparent to those skilled in the art that values in the left column of Table 3 are only exemplary.

TABLE 3

| | is_left_first = 1 | | is_left_first = 0 | |
| --- | --- | --- | --- | --- |
| Type | Left View | Right View | Left View | Right View |
| Side-by-side (half/full) type | Left side | Right side | Right side | Left side |
| Top-Bottom (half/full) type | Top side | Bottom side | Bottom side | Top side |
| Vertical line interleaved type | Odd line | Even line | Even line | Odd line |
| Frame sequential type | Odd frame | Even frame | Even frame | Odd frame |

The video sequence description information 415 specifies the order of a left-view image and a right-view image in the stereoescopic video. For example, the video sequence description information 415 may be represented in such a manner to show whether the left-view image precedes the right-view image ("is_left_first") or the right-view image precedes the left-view image ("is_right_first"). The example of the video sequence description information 415 is described above with reference to Table 2, and hence the detailed description thereof will not be reiterated.

FIG. 7 is a diagram illustrating an example of file syntax that represents the asset file header 400a of FIG. 6. The file syntax of FIG. 7 is created based on stereoscopic video information (svin) box file format that is specified by ISO/IEC 23008-1, which is provided only for example. That is, the asset file header 400a of FIG. 6 may be created based on other standards or other file formats.

Referring to FIG. 7, the service compatibility information 411 of FIG. 6 is represented by an element, "is_service_compatible", for which a value of "0" indicates no compatibility with a 2D video service, and a value of "1" indicates compatibility with a 2D video service. Additionally, the video type description information 412 and the base video description information 413 of FIG. 6 are represented by elements, "is_left" and "is_base", respectively. It is understood that these elements are included only when the element "is_service_compatible" indicates the compatibility with a 2D video service. On the contrary, if "is_service_compatible" indicates no compatibility with a 2D video service, the composition type information 414 and the video sequence description information 415 may be included, which are represented by elements, "stereoscopic_composition_type" and "is_left_first", respectively. For example, the element "stereoscopic_composition_type" may indicate the content shown in Table 3. In addition, file syntax may further include elements for indicating a scheme, a length, and a value of an asset ID.

Referring back to FIG. 3, the signaling message generator 220 generates a signaling message for delivery and/or consumption of stereoscopic video data. Here, the signaling message is a message of a format specified by ISO/IEC 23008-1, containing information in the forms of signaling tables, descriptors, or the like. The signaling message generator 220 may generate the signaling message based on not only representation information and transport characteristics of the relevant asset, but also the stereoscopic video data and various information received from the MMT receiving entity.

According to one aspect of the present embodiment, the signaling message generated by the signaling message generator 220 may carry stereoscopic video information required for the consumption of an MMT package that contains stereoscopic video data. For example, the signaling message generator 220 may generate a signaling message that contains the stereoscopic video information contained in the asset file header 310 of the asset file 300 shown in FIG. 4. That is, the signaling message generator 220 may generate a signaling message that contains composition type information, video sequence description information and video type description information. In another example, the signaling message generator 220 may generate a signaling message that contains the stereoscopic video information contained in the asset file header 410 of the asset file 400 shown in FIG. 6. In this case, the signaling message generator 220 may generate a signaling message that contains service compatibility information, video type description information, base video description information, composition type information, and video sequence description information.

According to another aspect of the present embodiment, the signaling message generated by the signaling message generator 220 may not contain the stereoscopic video information that is described with reference to FIG. 4 or FIG. 6. In this case, the signaling message may contain other types of information specified by ISO/IEC 23008-1. However, this embodiment is only confined to a case where the asset file header of the asset file contains stereoscopic video information, as described with reference to FIG. 4 or FIG. 6. It is, however, apparent to those skilled in the art that even when the stereoscopic video information is contained in the asset file header of the asset file, the entire or part of the stereoscopic video information can be contained in the signaling message generated by the signaling message generator 220. Hereinafter, a case will be described in which all the stereoscopic video data is contained in the signaling message generated by the signaling message generator 220.

For example, the signaling message generator 220 may include the stereoscopic video information in an MMT package (hereinafter, referred to as "MP") table specified by ISO/IEC 23008-1. In this case, the stereoscopic video information may be one of descriptors contained in the MP table. Such a stereoscopic video information descriptor (hereinafter, referred to as "stereoscopic_vidoe_info_descriptor") may be contained in an asset_descriptor loop in the MP table.

FIG. 8 is a diagram illustrating an example of stereoscopic_video_info_descriptor that can be contained in an MP table. Referring to FIG. 8, the stereoscopic_video_info_descriptor contains composition type information, video sequence description information, and video type description information. More specifically, the composition type information is represented by an element, "stereoscopic_composition_type", the video sequence description information is represented by an element, "is_left_first", and the video type description information is represented by an element, "stereoscopic_composition_type". Also, it is shown that the video type description information is included only when a value of "stereoscopic_composition_type" is "0x03", which indicates that a left/right view sequence type (refer to Table 1).

FIG. 9 is a diagram illustrating another example of stereoscopic_video_info_descriptor that can be contained in an MP table. Referring to FIG. 9, the stereoscopic_video_info_descriptor includes service compatibility information, video type description information, base video description information, composition type information, and video sequence description information. More specifically, the service compatibility information is represented by an element, "is_service_compatible", and the video type description information and the base video description information are represented by elements, "is_left" and "is_base", respectively. It is understood that these elements are included only when the element "is_service_compatible" indicates the compatibility with a 2D video service. On the contrary, if "is_service_compatible" indicates no compatibility with a 2D video service, the composition type information 414 and the video sequence description information 415 may be included, which are represented by elements, "stereoscopic_composition_type" and "is_left_first", respectively.

Referring back to FIG. 3, the transmitter 230 receives the asset file generated by the asset file generator 210 and/or the signaling message generated by the signaling message generator 220, and transmits them to the MMT receiving entity. Here, the transmitter 230 may convert the received asset file and/or signaling message into an MMT packet according to an MMT protocol (hereinafter, referred to as an "MMTP") that conforms to ISO/IEC 23008-1, and transmit the MMT packet to the MMT receiving apparatus. However, the present embodiment is not limited thereto, such that the transmitter 230 may transmit the received asset file and/or signaling message to the MMT receiving apparatus according to other Internet transport protocol, real-time transport protocol, or 3D broadcasting protocol.

Herein, a method for providing a 3DTV broadcasting service using the aforesaid MMT apparatus will be described. The method described herein relates to a method of signaling information related to 3D stereoscopic video data, i.e., stereoscopic video information, in which the stereoscopic video information is transmitted to a multichannel to provide a high-definition 3DTV broadcasting service while maintaining computability with a 2DTV broadcasting service, based on a high efficiency video coding (hereinafter, referred to as "HEVC") or scalable HEVC (hereinafter, referred to as "SHVC") codec that is chosen to code a high-definition video for ATSC 3.0.

Figure 10:
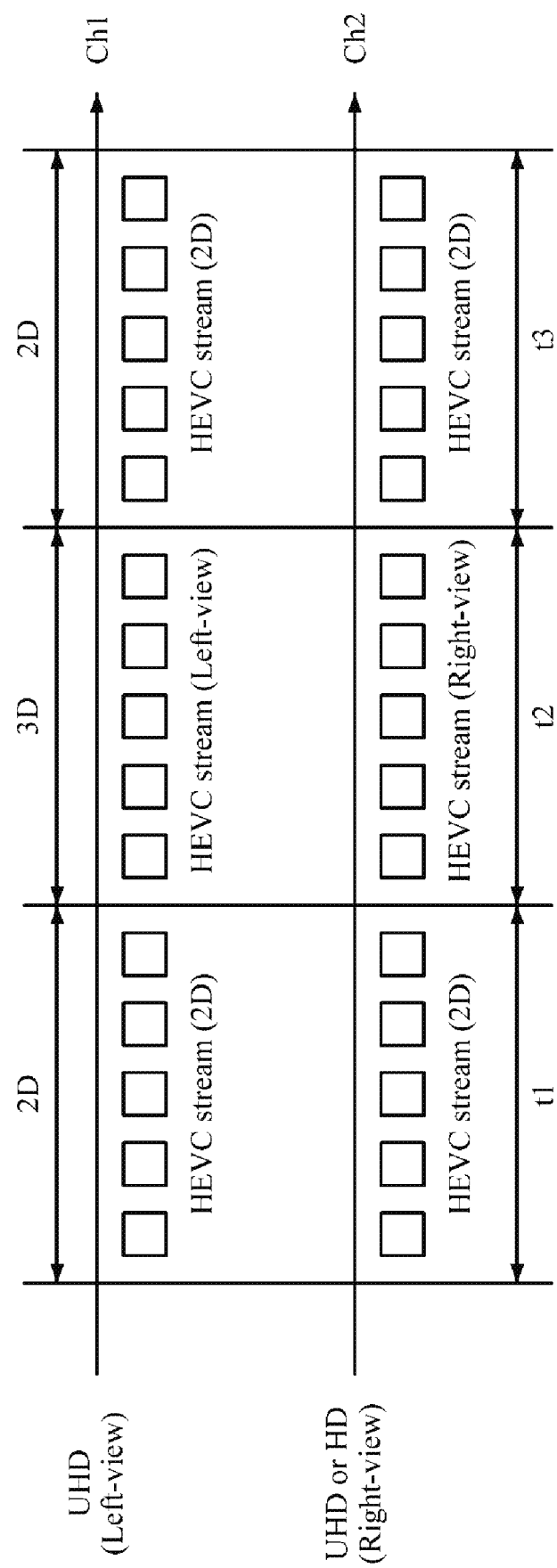
FIG. 10 is a diagram illustrating a service scenario for providing a 3DTV broadcasting service using two independent High Efficiency Video Coding (HEVC) codecs.

FIG. 10 is a diagram illustrating a service scenario for providing a 3DTV broadcasting service using two independent HEVC codecs. In FIG. 10, 2D denotes 2DTV broadcast programs which are independently provided by two channels, i.e., a first channel Ch1 and a second channel Ch2, and 3D denotes a 3DTV broadcast program which is provided by associating two channels. In addition, in the case of a 3DTV broadcast program, two independent HEVC streams are synchronized with each other and then provided, and it may be envisaged that the service is provided through two base layer streams.

Figure 11:
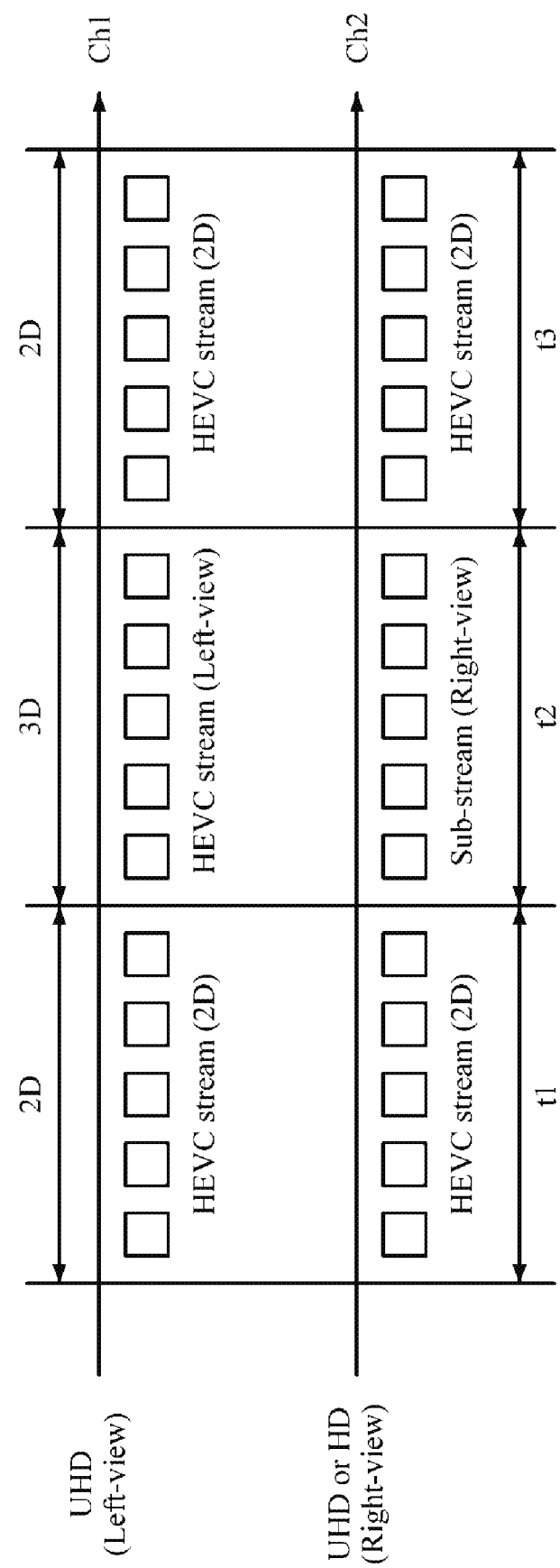
FIG. 11 is a diagram illustrating a service scenario for providing a 3DTV broadcast service using one scalable HEVC (SHVC) codec.

FIG. 11 is a diagram illustrating a service scenario for providing a 3DTV broadcast service using one SHVC codec. In FIG. 11, 2D denotes a 2DTV broadcast programs which are independently provided by two channels, i.e., a first channel Ch1 and a second channel Ch2, and 3D denotes a 3DTV broadcast program that is provided by associating two channels. In addition, in the case of a 3DTV broadcast program, a base layer stream which is generated by coding stereoscopic video data using a scalable HEVC codec, i.e., an SHVC codec, may be synchronized with an enhanced layer stream, and the resulting stream may be provided.

Referring to FIGS. 10 and 11, for the 3DTV broadcast service, 2DTV broadcast program is broadcast during a time period t1; 3DTV broadcast program is broadcast during a time period t2; and 2DTV broadcast program is broadcast again during a time period t3. This is because the 3DTV broadcast service is being considered to be a 2DTV/3DTV mixed broadcast service which provides a mixture of 2D content and 3D content, rather than broadcasting the 3D content alone for 24 hours. However, it is apparent to those skilled in the art that the 3DTV broadcast service does not preclude 3D programs being aired continuously for 24 hours.

According to the service scenario shown in FIG. 10 or FIG. 11, in order to provide the 3DTV broadcast service, it is needed to clearly identify whether a program to be broadcast at a specific time period is either a 2DTV broadcast program or a 3DTV broadcast program. For example, in the event of switch between a 2DTV broadcast program and a 3DTV broadcast program, information may be transmitted to notify of said event. In addition, for the 3DTV broadcast program, information required for playing back the 3DTV broadcast program by a receiving apparatus which is equipped with a 2D display may also be transmitted.

In another example, program type description information may be transmitted to identify whether a broadcast program to be broadcast at a specific time period is either a 2DTV broadcast program or a 3DTV broadcast program. Here, if the broadcast program is a 3DTV broadcast program, information required for playing back the 3DTV broadcast program by a receiving apparatus having a 2D display may be transmitted together with the program type description information. Hereinafter, the program type description information and the information required for playing back a 3DTV broadcast program by a receiving apparatus having a 2D display will be inclusively referred to as "stereoscopic video information".

In this case, the stereoscopic video information may be transmitted in a video level or a system level. The transmission in the video level means that the stereoscopic video information is transmitted in a video stream. For example, the stereoscopic video information contained in the asset file header of FIG. 4 or FIG. 6 may be stereoscopic video information transmitted at the video level. On the other hand, the transmission in the system level means that the stereoscopic video information is transmitted in a non-video stream. For example, the stereoscopic_video_info_descriptor contained in an MP table of the signaling message described with reference to FIG. 8 or FIG. 9 may be stereoscopic video information transmitted at the video level.

FIG. 12 is a diagram illustrating another example of the stereoscopic video information transmitted at the system level, which is HEVC_stereoscopic_video_info_descriptor. Referring to FIG. 12, the HEVC_stereoscopic_video_info_ descriptor includes descriptor_tag, descriptor_length, service_id, view_position, and 2D/3D indicator information (hereinafter, referred to as "multi_view_position_SEI_present").

The descriptor_tag information is to identify a descriptor. The descriptor_length information specifies a length of the descriptor. The service_id information indicates a channel ID or service ID for transmitting a left-view image or a right-view image. For example, in the case of where, as shown in FIG. 10, a left-view image is provided through the first channel and a right-view image is provided through the second channel, the service_id of HEVC_stereoscopic_video_info_descriptor transmitted through the first channel may include a service ID or channel ID of the second channel. The view_position is to identify whether the currently transmitted video is a left-view image or a right-view image.

The multi_view_position_SEI_present indicates whether or not an HEVC or SHVC coded stream contains a 2D/3D indicator (hereinafter, referred to as "multi_view_position_ SEI"). By using the multi_view_position_SEI_present, it is more clearly identified whether the relevant video stream is for a 2DTV program or a 3DTV program. Because information transmission at the system level is performed at specified intervals (e.g., 500 ms), rather than on a frame-by-frame or AU-by-AU basis, it is difficult to distinctly identify on a frame basis whether content is 2D content or 3D content. Therefore, when the multi_view_position_ SEI_present is set to "1", a receiver can recognize a 2DTV program or a 3DTV program at a coded stream level based on said information. Moreover, based on the presence or absence of the relevant descriptor, it is possible to identify a 2DTV program or a 3DTV program at the system level. To be specific, said descriptor is present in a 3D program.

HEVC ISO/IEC 23008-2 defines a multi_view_position_ SEI message, which is used to provide information about a position of each view when a multi-view image consisting of numerous views is coded. An example of the multi_view_ position_SEI message is shown in FIG. 13, and said message is specifically described by HEVC ISO/IEC 23008-2, and hence the detailed description thereof will be omitted.

Figure 14:
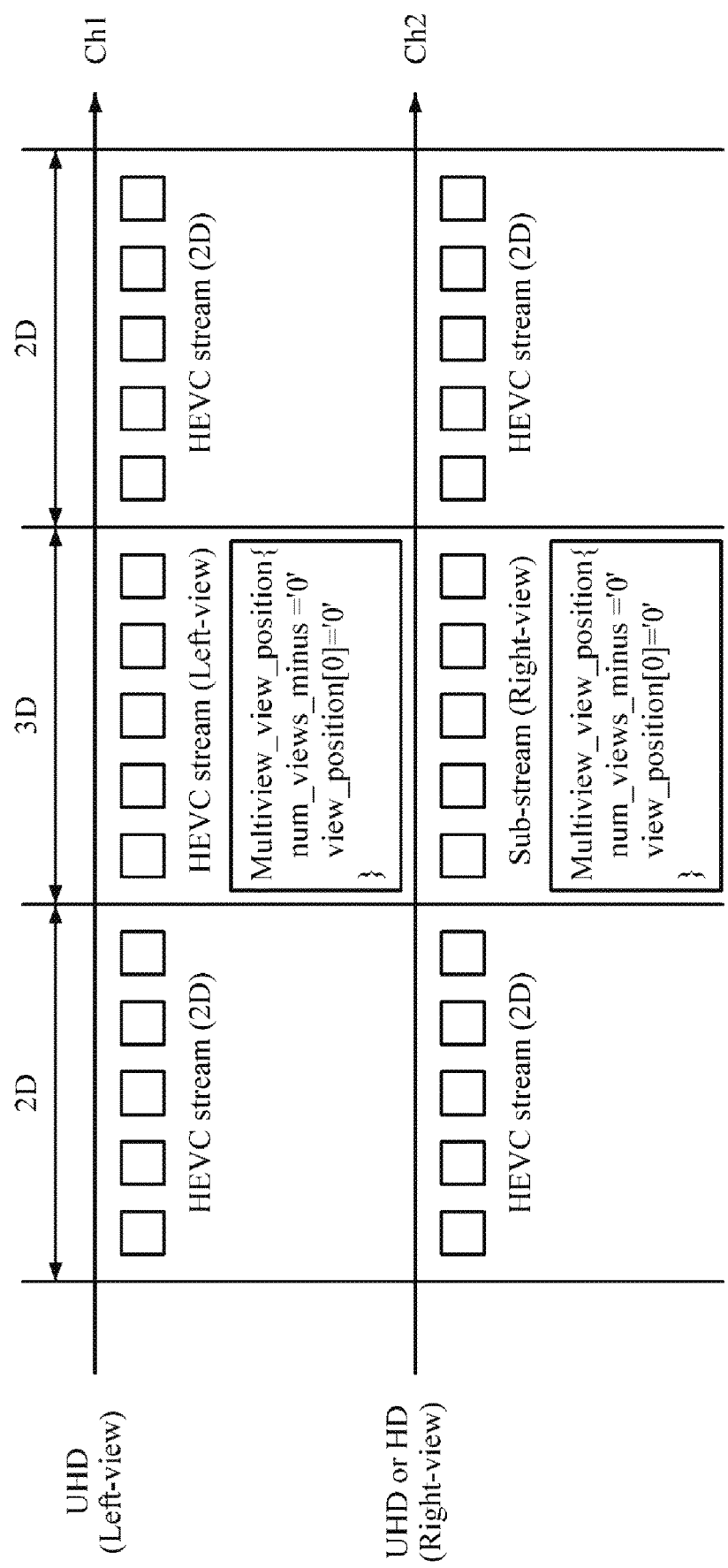
FIG. 14 is a diagram illustrating the service scenario of FIG. 10 for explaining an example of a method of distinguishing between a 2DTV program and a 3DTV program at the video level.

FIG. 14 is a diagram illustrating the service scenario of FIG. 10 for explaining an example of a method of distinguishing between a 2DTV program and a 3DTV program at the video level. Referring to FIG. 14, it is seen that the multi_view_position_SEI message of FIG. 13 is transmitted only during a 3D program period. Thus, it is possible to determine whether a current program is a 2DTV program or a 3DTV program based on whether said message is included in the video level, i.e., transmitted program content.

In addition, in the case where a video stream which is coded using two independent HEVC codecs is transmitted through each channel, the multi_view_position_SEI message is included in the video stream through both the first and second channels Ch1 and Ch2. At this time, information contained in the coded stream through the first channel Ch1 and the second channel Ch 2 is assigned as num_view_ni-mus1=0 and view_position[0]== since only one independent video stream is transmitted. In this case, a left view and a right view cannot be identified at the video level, and hence stereoscopic video information transmitted at the system level, for example, HEVC stereoscopic_video_info_descriptor of FIG. 12, may be used to distinguish between a left-view image and a right-view image.

Also, the multi_view_position_SEI message may be assigned to an AU of the coded stream. In this way, the multi_view_position_SEI message is contained in each AU in a 3DTV program period, as shown in FIG. 14, and hence it is possible to identify a 3DTV program or a 2DTV program at the frame level.

Figure 15:
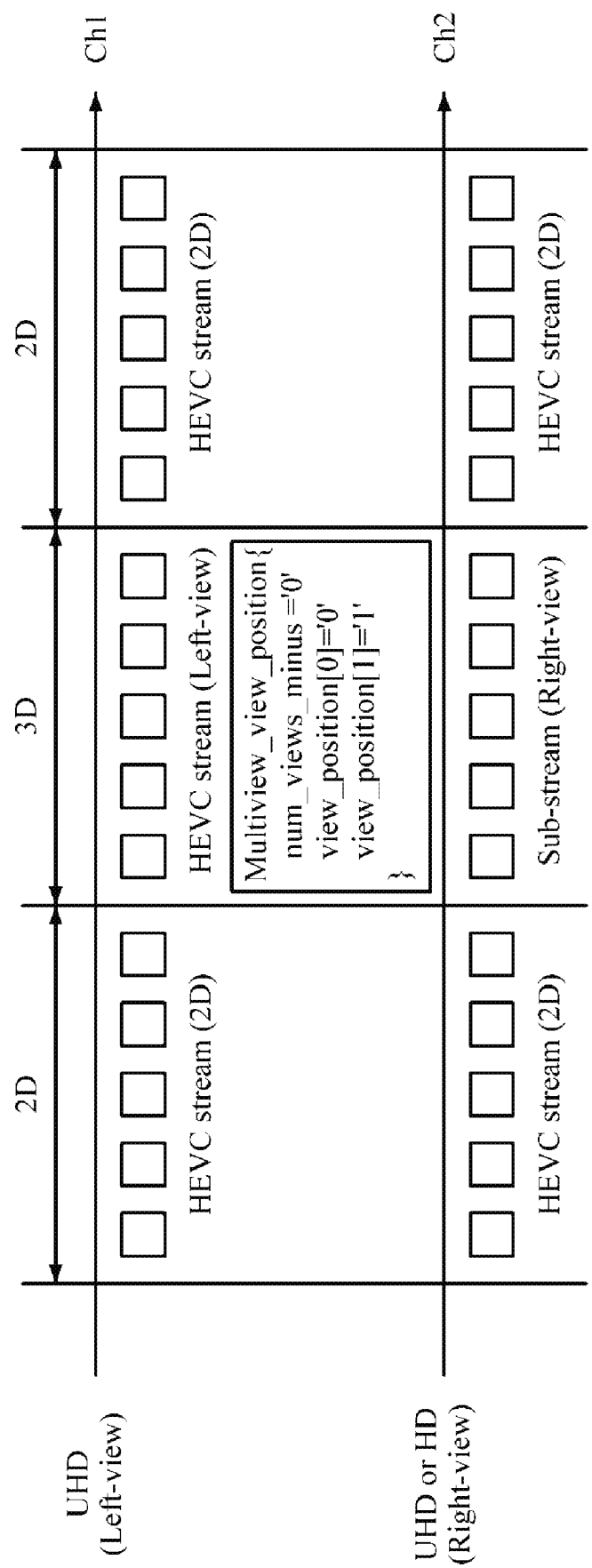
FIG. 15 is a diagram illustrating the service scenario of FIG. 11 for explaining an example of a method of distinguishing between a 2DTV program and a 3DTV program at the video level.

FIG. 15 is a diagram illustrating the service scenario of FIG. 11 for explaining an example of a method of distinguishing between a 2DTV program and a 3DTV program at the video level. Referring to FIG. 15, it is seen that the multi_view_position_SEI message shown in FIG. 13 is transmitted only in a base layer video stream. Thus, based on whether or not said message is contained in the base level video stream, it is possible to determine whether a current program is a 2DTV program or a 3DTV program. In this case, in the service scenario of FIG. 15, two view-videos are coded through SHVC, so that num_view_minus1=1, view_position[0]=0, and view_position[1]=1 are assigned to the base layer video stream. Here, view_position[0]=0 may indicate a left(right)-view image, and view_position[1]=1 may indicate a right(left)-view image. Therefore, it is possible to distinguish between the left-view image and the right-view image.

The above-described device according to the exemplary embodiment of the present invention may be realized in the form of a hardware component, a software component, and/or a combination of a hardware component and a software component. For example, the device and corresponding components according to the above-described exemplary embodiments of the present invention may be realized by using at least one or more universal computers or special-purpose computers, such as a processor, a controller, an arithmetic logic unit (ALU), a digital signal processor, a field programmable array (FPA), a programmable logic unit (PLU), a microprocessor, or any type of device that can execute and respond to an instruction (or command). A processing device may execute an operating system (OS) and at least one or more software application, which is executed within the operating system (OS). Additionally, the processing device may respond to the execution of a software application, so as to access, store, manipulate, process, and generate data. In order to facilitate and simplify the understanding of the present invention, the present invention may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be configured herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method according to the exemplary embodiment of the present invention may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the medium may correspond to a program command that is specifically designed and configured for the exemplary embodiments of the present invention, or the program command may correspond to a program command that is disclosed and available to anyone skilled in or related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be efficiently applied to procedures, devices, and broadcasting industries which are related to storage or transmission of media data.

The invention claimed is:

1. An MPEG media transport (hereinafter, referred to as "MMT") apparatus, the MMT apparatus comprising:
    an asset file generator configured to generate a single asset file, wherein the asset file includes a stereoscopic video; and
    a signaling message generator configured to generate a signaling message for the stereoscopic data,
    when the stereoscopic video data is coded based on a scalable HEVC(SHVC), wherein a multiview view position SEI message is used to indicate left view and right view of the stereoscopic video data,
    wherein the multiview view position SEI message includes num views minus 1 and view position.

2. The MMT apparatus of claim 1, wherein asset file is generated based on an access unit (AU).

3. The MMT apparatus of claim 1, wherein a MMT package is a group of media content data and related metadata, and is composed of presentation information (PI), one or more assets.

4. The MMT apparatus of claim 1, wherein each asset include one or more media processing units (MPUs).

5. The MMT apparatus of claim 1, wherein each asset has an asset ID as an identifier.

6. The MMT apparatus of claim 3, wherein the presentation information is information that describes the spatial and temporal relationships among MMT assets.

7. The MMT apparatus of claim 1, a MMT package includes QoS information required for asset delivery.

8. The MMT apparatus of claim 7, wherein the one QoS information required for asset delivery is associated with multiple assets.

9. The MMT apparatus of claim 1, wherein the signaling message is packetized together with media data into an MMT packet for delivery, or is packetized into a MMT packet as a separate signaling message.

10. A method for MPEG media transport (hereinafter, referred to as "MMT") apparatus, the method comprising:
   generating a single asset file for a MMT package, wherein the asset file includes a stereoscopic video; and
   generating a signaling message for the stereoscopic data, when the stereoscopic video data is coded based on a scalable HEVC(SHVC), wherein a multiview view position SEI message is used to indicate left view and right view of the stereoscopic video data,
   wherein the multiview view position SEI message includes num views minus 1 and view position.

11. The method of claim 10, wherein asset file is generated based on an access unit (AU).

12. The method of claim 10, wherein a MMT package is a group of media content data and related metadata, and is composed of presentation information (PI), one or more assets.

13. The method of claim 10, wherein each asset include one or more media processing units (MPUs).

14. The method of claim 10, wherein each asset has an asset ID as an identifier.

15. The method of claim 12, wherein the presentation information is information that describes the spatial and temporal relationships among MMT assets.

16. The method of claim 10, a MMT package includes QoS information required for asset delivery.

17. The method of claim 16, wherein the one QoS information required for asset delivery is associated with multiple assets.

18. The method of claim 10, wherein the signaling message is packetized together with media data into an MMT packet for delivery, or is packetized into a MMT packet as a separate signaling message.

* * * * *